(12) United States Patent  (10) Patent No.: US 7,182,299 B2
Takeuchi  (45) Date of Patent: Feb. 27, 2007

(54) FIXING TOOL

(75) Inventor: Yasuichi Takeuchi, Tokyo (JP)

(73) Assignee: Takeuchi Industrial Co., Ltd., Tokyo (JP)

( * ) Notice: Subject to any disclaimer, the term of this patent is extended or adjusted under 35 U.S.C. 154(b) by 124 days.

(21) Appl. No.: 11/047,861

(22) Filed: Jan. 31, 2005

(65) Prior Publication Data

US 2006/0175473 A1    Aug. 10, 2006

(51) Int. Cl.
*F16B 15/00* (2006.01)

(52) U.S. Cl. .................. 248/71; 24/16 PB; 248/73; 248/222.12

(58) Field of Classification Search ............ 248/71, 248/74.1, 74.2, 73, 222.12, 222.11; 24/16 PB, 24/297, 298
See application file for complete search history.

(56) References Cited

U.S. PATENT DOCUMENTS 4,143,577 A * 3/1979 Eberhardt ............... 411/548
4,669,688 A * 6/1987 Itoh et al. ............... 248/74.2
6,669,149 B2 * 12/2003 Akizuki ..................... 248/71
6,749,157 B2 * 6/2004 Takeuchi ................... 248/71
6,923,406 B2 * 8/2005 Akizuki ..................... 248/71

FOREIGN PATENT DOCUMENTS

JP   9-242936    9/1997
JP   2004-239325  8/2004

* cited by examiner

*Primary Examiner*—Ramon O Ramirez
(74) *Attorney, Agent, or Firm*—Michael Best & Friedrich LLP

(57) ABSTRACT

In a fixing tool, a fitting portion includes a post, clamp plate, elastic press piece, and locking/unlocking piece. The clamp plate can be inserted through a fitting hole from an upper surface side of a chassis. The elastic press piece is elastically abutted against the upper surface of the chassis. The locking/unlocking piece is formed at part of the elastic press piece. When the clamp plate is inserted through the fitting hole and moved in one direction along a lower surface of the chassis, the locking/unlocking piece engages with an edge of the fitting hole opposite the direction of movement.

3 Claims, 10 Drawing Sheets

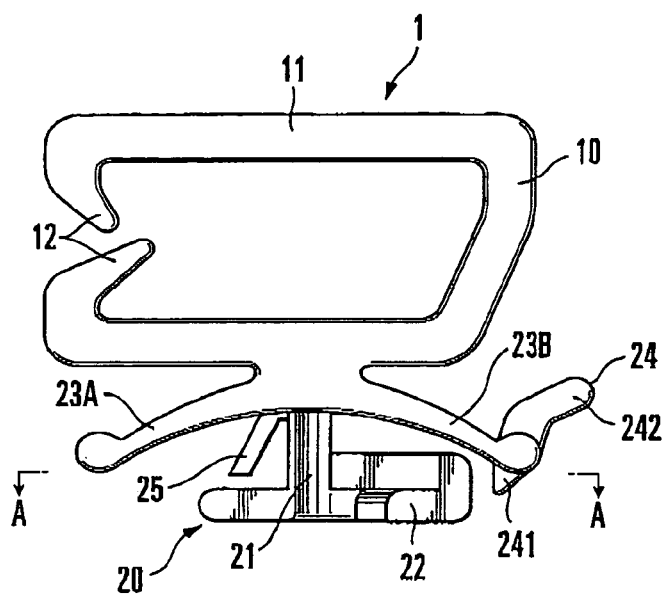
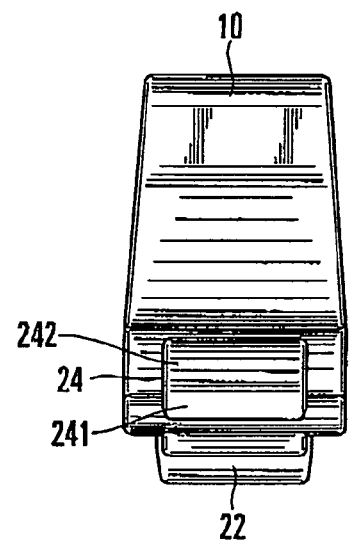
FIG.3A  FIG.3B
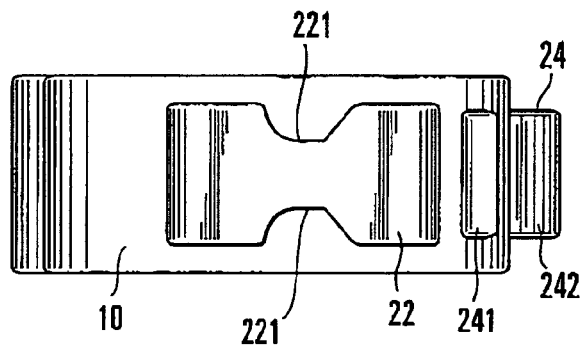
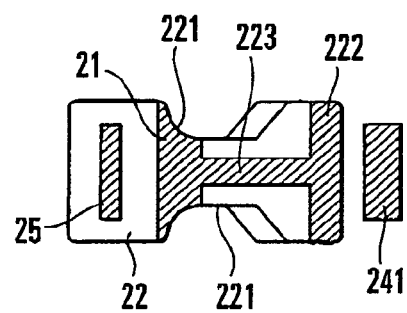
FIG.3C  FIG.3D
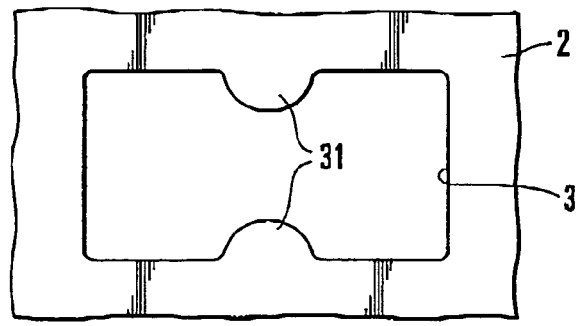
FIG.4

FIXING TOOL

BACKGROUND OF THE INVENTION

The present invention relates to a fixing tool used to package an electronic component, cable, or the like on the chassis of an electronic device and, more particularly, to a fixing tool that can be easily removed from the upper surface side of the chassis.

When an electronic device is to be assembled, electronic components must be mounted on an assembly board such as a panel, chassis, board, or the like (which will be referred to as a chassis hereinafter), and a wiring component such as a cable must be extended on the chassis. For this purpose, a fixing tool as a packaging component is used. For example, when a flat cable is to be extended along the upper surface of a chassis, a fixing tool called a flat cable clamp to hold the flat cable on the chassis is used. FIG. 15 shows an example of a conventional flat cable clamp (to be referred to as FCC hereinafter). In this FCC 1A, an L-shaped clamp piece 41 projects on one end side of a base 40 having a width slightly larger than that of a flat cable FC to be held. An arrowhead-shaped hook 42 formed at the distal end of the clamp piece 41 enters between a support piece 43, formed on the other end side on the base 40, and a lock piece 44 and is engaged by the support piece 43 and lock piece 44. Thus, the flat cable FC is held between the base 40 and clamp piece 41.

A fitting piece 46 which forms an arrowhead extending toward its proximal end is connected to the distal end of a post 45 projecting downward from the bottom surface of the base 40. An elastic press piece 47 which is open like wings to oppose the fitting piece 46 is formed at the proximal end of the post 45. When the fitting piece 46 is inserted through a through hole formed in a chassis 2 from the upper surface side, the two ends of the fitting piece 46 are reduced in diameter by the elasticity to extend through the through hole. After passing through the through hole, the two ends of the fitting piece 46 are enlarged in diameter so that they fit with the inner edge of the through hole. At this time, the elastic press piece 47 is in elastic contact with the upper surface of the chassis 2. This elastic contact force holds the fitting state of the fitting piece 46 and through hole. Thus, the FCC 1A is fixed to the chassis 2. As an example of a fixing tool having a fitting portion with such a structure, for example, one described as an electrical wire bundle clamp in patent reference 1 (Japanese Patent Laid-Open No. 9-242936) is available.

In recent years, in home electric appliances, OA devices, automobiles, and electronic devices as a whole, environmentally friendly products must be sold to solve environmental issues. Along with this demand, for example, a printed board and wiring lines built in an electronic device must be able to be disassembled from the chassis, panel, or the like of the electronic device. In particular, when disassembling wiring lines, the wiring lines and an FCC that holds the wiring lines must be removed from the upper surface side of the chassis. In the conventional FCC 1A shown in FIG. 15, when removing the FCC 1A from the chassis 2, the fitting piece 46 must be reduced in diameter and be extracted from the through hole. As the fitting piece 46 is arranged as it is concealed on the lower surface side of the chassis 2, the fitting piece 46 cannot be operated from the upper surface side of the chassis 2, and cannot but be operated from the lower surface side of the chassis 2. Therefore, the fitting piece 46 cannot be removed from the upper surface side of the chassis 2, and the demand for easy removal as described above cannot be satisfied. In addition, as the fitting piece 46 is small and difficult to hold with fingers, it is very difficult to operate. As an FCC of this type, one is available in which the lower surface of the base is fixed to a chassis with an adhesive tape. It is, however, cumbersome to remove the adhesive tape. If the adhesive tape is left attached to the chassis or FCC, an issue arises in environmental protection.

In view of this problem, in Japanese Patent Application No. 2003-27604, the present applicant has proposed a fixing tool which can be removed easily from the upper surface side of the chassis. This fixing tool has a clamp piece which is to be fitted with the inner edge of a hole formed in the chassis and clamps the inner edge, and a locking body which engages with the inner edge of the hole and locks movement of the fixing tool in the opposite direction. The fixing tool can be attached to and removed from the chassis by only operating it from the upper surface side of the chassis.

The proposed fixing tool has a substantially L-shaped cantilevered structure to fit the clamp piece with the inner edge of the hole from one direction. Accordingly, the clamp force of the chassis obtained by the clamp piece is not necessary sufficient. In particular, with a fixing tool in which the clamp piece is made compact to downsize the fixing tool, when an external force is applied in a direction to incline the fixing tool with respect to the chassis, the force concentrates at the intended portion. It is accordingly difficult to ensure stable clamp with the clamp piece, leaving room to improve in terms of reliability.

SUMMARY OF THE INVENTION

It is an object of the present invention to provide a fixing tool with a high fixing strength which cannot only be removed from the upper surface side of a chassis easily but also clamp a board with a clamp piece and elastic press piece to enhance the stability of the fitting state.

In order to achieve the above object, according to the present invention, there is provided a fixing tool comprising a holding portion for holding a component on a chassis, and a fitting portion which is formed integrally with the holding portion and fits in a fitting hole formed in the chassis to fix the holding portion on the chassis, the fitting portion including a post projecting for a length of not less than a thickness of the chassis, a clamp plate which is formed at a distal end of the post and can be inserted through the fitting hole from an upper surface side toward a lower surface side of the chassis, an elastic press piece which is formed at a portion in the vicinity of a proximal end of the post and elastically abutted against an upper surface of the chassis, and a locking/unlocking piece formed at part of the elastic press piece, wherein when the clamp plate inserted through the fitting hole is slid in one direction along a lower surface of the chassis, the clamp plate comes into contact with the lower surface of the chassis at not less than one portion of an edge of the fitting hole, to clamp the edge together with the elastic press piece, and the locking/unlocking piece engages with an edge in an opposite direction of the fitting hole.

BRIEF DESCRIPTION OF THE DRAWINGS

FIG. 3A to 3C are a front view, right side view, and bottom view, respectively, of the fitting portion;

FIG. 3D is a sectional view taken along the line A—A of FIG. 3A;

FIG. 4 is a plan view of a fitting hole;

DESCRIPTION OF THE PREFERRED EMBODIMENTS

First Embodiment

Figure 1:
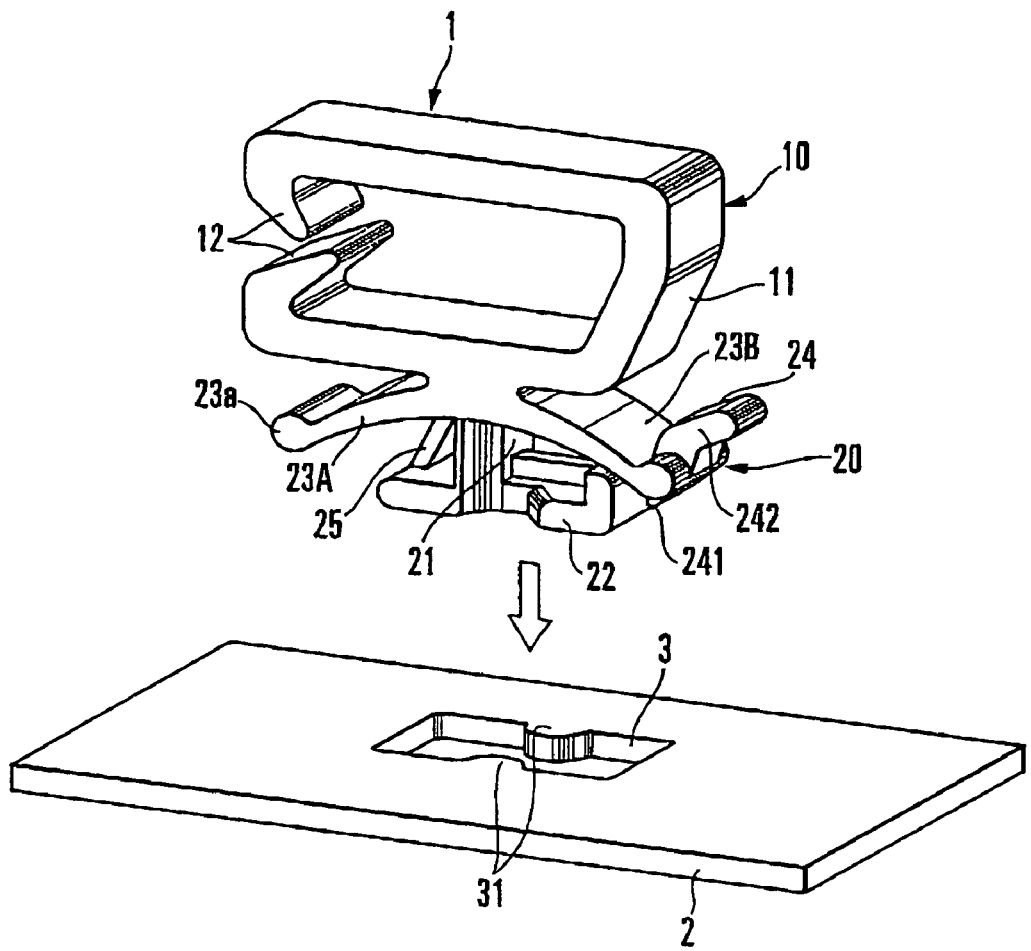
FIG. 1 is a perspective view of the first embodiment in which a fixing tool of the present invention is applied to a wire saddle.
Figure 2:
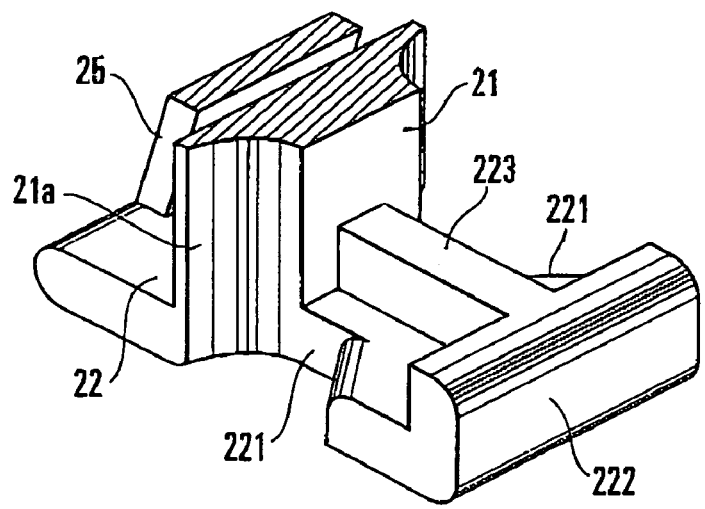
FIG. 2 is a cutaway perspective view showing part of a fitting portion in detail.

The first embodiment of the present invention will be described with reference to the accompanying drawings. FIG. 1 shows the appearance of the first embodiment in which a fixing tool of the present invention is applied to a wire saddle that holds wires along a chassis. FIG. 2 explains part of a fitting portion in detail. FIG. 3A to 3C show the fitting portion, and FIG. 3D show the section along the line A—A of FIG. 3A. Referring to FIGS. 1 to 3D, a wire saddle 1 is formed of a holding portion 10 which holds wires to be held along a chassis, and a fitting portion 20 which fixes the holding portion 10 to a chassis 2. The holding portion 10 and fitting portion 20 are integrally formed by resin molding. The fitting portion 20 is fitted in a fitting hole 3 formed in the fitting hole 3. Thus, the wire saddle 1 can be attached to or removed from the chassis 2.

The holding portion 10 has a substantially sideways U-shaped portion 11. A pair of coming-off preventive pieces 12 project inward in a tapered manner from the two end edges of the opening of the sideways open U-shaped portion 11. A wire (not shown) is inserted in the U-shaped portion 11 through the pair of coming-off preventive pieces 12. After the insertion, the wire is prevented from coming off from the holding portion 10 by the pair of coming-off preventive pieces 12.

The fitting portion 20 has a short post 21 which projects vertically downward from substantially the central portion of the lower side of the holding portion 10. A horizontal clamp plate 22 is integrally formed at the lower end of the post 21. A pair of elastic press pieces 23A and 23B integrally project from the proximal end of the post 21. The elastic press pieces 23A and 23B have wings that are curved slightly downward toward the two outer sides along the lengthwise direction of the U-shaped portion 11. A locking/unlocking piece 24 is integrally formed at the distal end of one elastic press piece 23B.

As shown in FIG. 4, the fitting hole 3 formed in the chassis 2 has a rectangle shape as a whole with round corners. Semicircular projections 31 project semicircularly inward from substantially the middle points of the respective long sides on the two sides of the rectangle shape. In particular, the fitting hole 3 is axi-symmetrical in both the vertical and horizontal directions. This is one of the characteristic features of the present invention.

The fitting portion 20 will be described in detail. The clamp plate 22 is a thin plate having a thickness of about 1 mm, and has a planar shape substantially the same as that of the fitting hole 3. The clamp plate 22 has a rectangular shape as a whole with round corners. The clamp plate 22 has almost semicircular recesses 221 projecting inward at substantially the middle points of the respective long sides on the two sides of the rectangle shape. The clamp plate 22 can be inserted through the fitting hole 3 in the direction of the thickness, and integrally has the post 21 across its positions each along one end side of the recess 221 of the corresponding side. Hence, two side surfaces 21a of the post 21 are curved arcuately along the respective recesses 221. A locking wall 222 having an upward round outer surface vertically stands upward at the end on the opposite side of the clamp plate 22. On the upper surface of the clamp plate 22, a reinforcing rib 223 extends from the post 21 to the locking wall 222. Even if the clamp plate 22 is thin, as described above, the locking wall 222 and reinforcing rib 223 can suppress deformation caused by an external force.

On one end side of the clamp plate 22, an elastic piece 25 projects from the proximal end of the post 21 obliquely downward like a tongue. The elastic piece 25 extends until its lower end is close to the upper surface of the clamp plate 22.

The distance between the two ends of the pair of elastic press pieces 23A and 23B is slightly longer than the length in the longitudinal direction of the fitting hole 3. The distal end of the elastic press piece 23A on one end side forms as an abutting portion 23a which abuts against the lower surface of the chassis 2. The locking/unlocking piece 24 at the distal end of the elastic press piece 23B on the opposite side has a locking pawl 241 projecting downward, and an unlocking knob 242 projecting upward. Thus, particularly when the unlocking knob 242 is operated with fingers, the distal end of the elastic press piece 23B can be upwardly, elastically deformed.

Figure 5A:
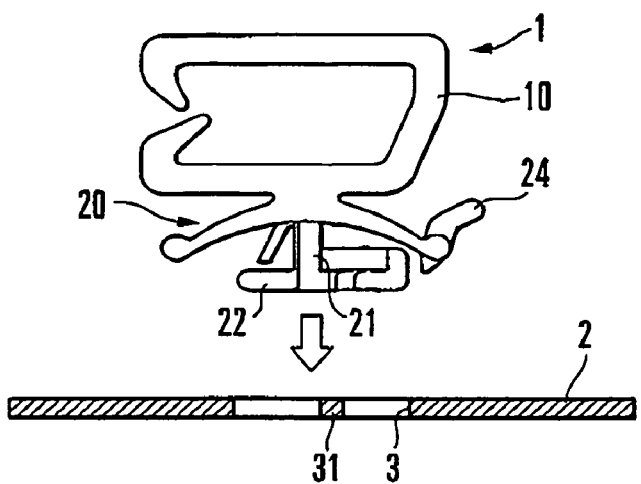
FIGS. 5A to 5D are front views showing the steps of mounting a wire saddle on a chassis.
Figure 5B:
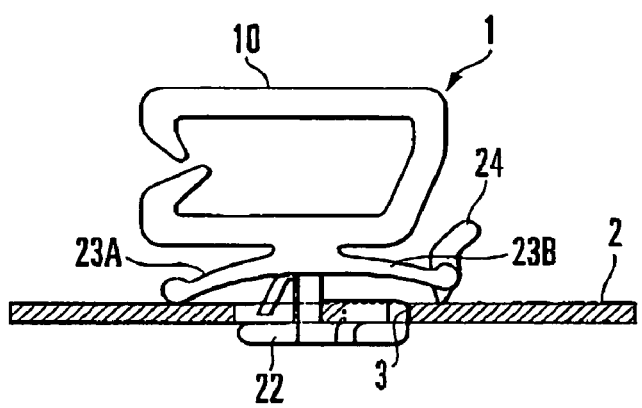
Figure 5C:
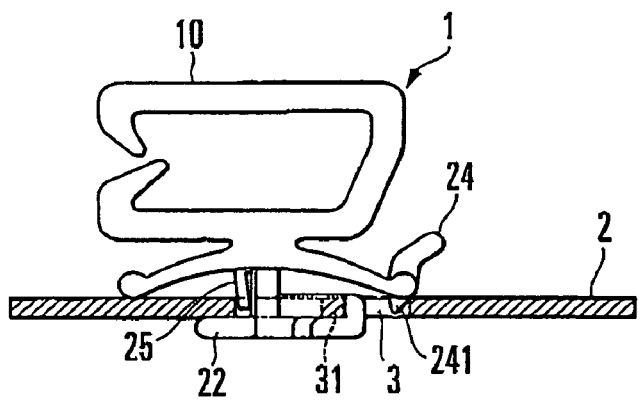
Figure 5D:
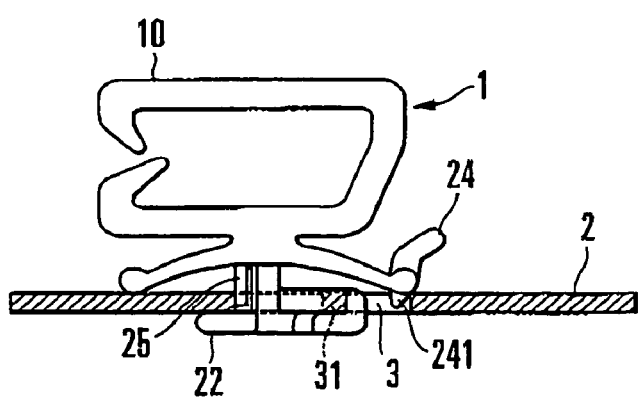
Figure 6A:
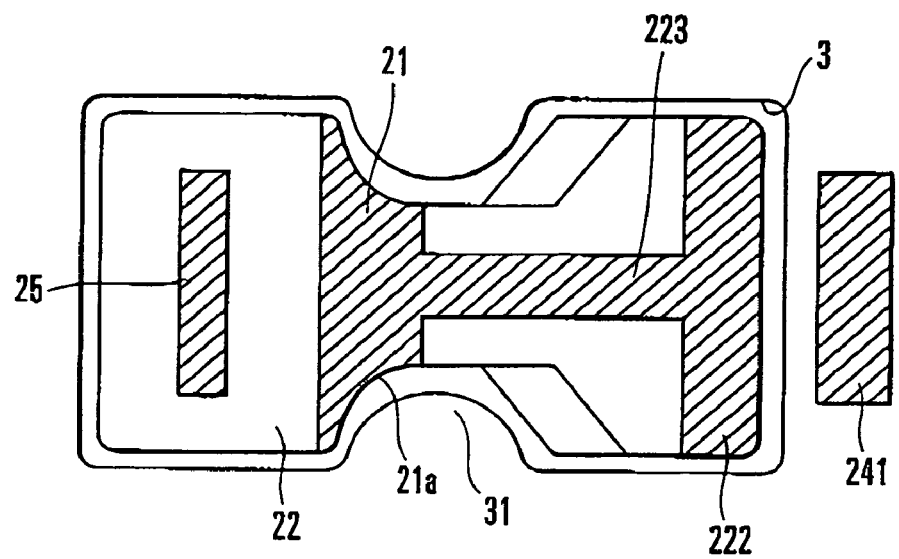
FIGS. 6A and 6B are detailed sectional views taken along the line A—A of FIG. 3A.
Figure 6B:
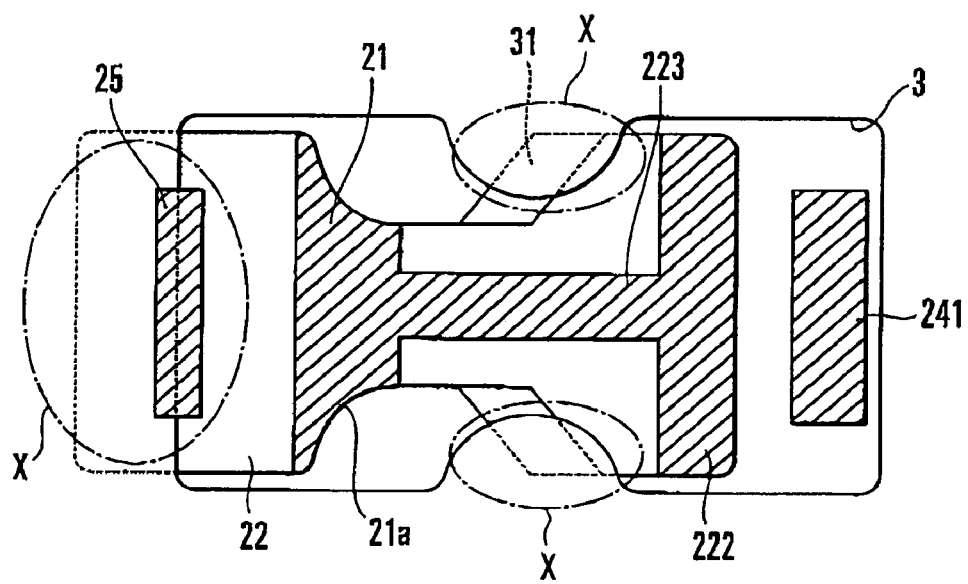

When the wire saddle 1 having the above structure is to be attached to the chassis 2, the clamp plate 22 is inserted through the fitting hole 3 from the upper surface side of the chassis 2, as shown in FIGS. 5A and 5B. At this time, the two arcuately curved side surfaces 21a of the post 21 are abutted against the semicircular projections 31 of the fitting hole 3. Simultaneously, the locking wall 222 of the clamp plate 22 is abutted against the edge on the opposite side of the fitting hole 3. Thus, the clamp plate 22 can be positioned with respect to the fitting hole 3, and inserted through the fitting hole 3 easily. FIG. 6A shows this state taken along the line A—A of FIG. 3A. With the distal ends of the elastic press pieces 23A and 23B abutting against the upper surface of the chassis 2, when the clamp plate 22 is further pushed in, the upper surface of the clamp plate 22 is positioned substantially on the same plane as the lower surface of the chassis 2. Then, when the wire saddle 1 is slid toward one end side, the upper surface on one end side of the clamp plate 22 abuts against the lower surface of the chassis 2 on the edge on one end side of the fitting hole 3, as shown in FIG. 5C. Simultaneously, the two side portions of the clamp plate 22 abut against the lower surfaces of the semicircular projections 31. At this time, the two side surfaces 21a of the post 21 and the two side surfaces of the locking wall 222 are guided as they are in contact with or close to the inner edge of the fitting hole 3. Thus, the wire saddle 1 can be slid smoothly. As the clamp plate 22 is further slid, the elastic piece 25 abuts against the edge on one end side of the fitting hole 3 and is deformed elastically, and simultaneously an elastic force toward the opposite side is generated in the clamp plate 22. When the slide distance reaches a predetermined value, the locking pawl 241 formed on the elastic press piece 23B falls in the fitting hole 3 on the opposite side, as shown in FIG. 5D, and engages with the edge on the opposite side. FIG. 6B shows this state taken along the line A—A of FIG. 3A.

Figure 7:
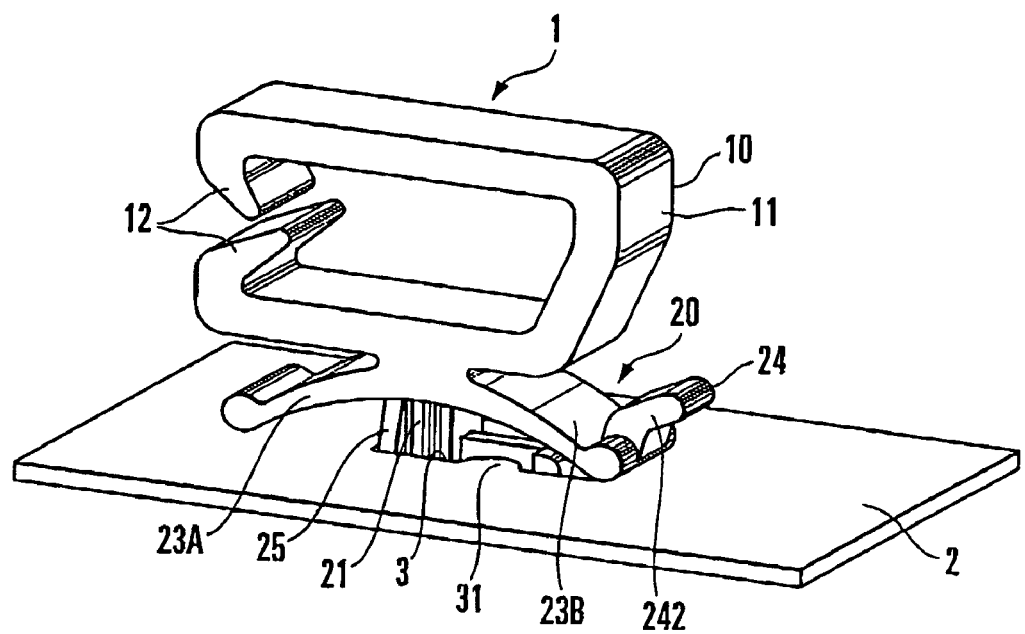
FIG. 7 is a perspective view showing a state wherein the wire saddle is mounted on the chassis.

In this state, the pair of elastic press pieces 23A and 23B elastically abut against the upper surface of the chassis 2 to bias the clamp plate 22 upward. Simultaneously, the clamp plate 22 is abutted against the lower surface of the chassis 2 at three portions, i.e., on the edge on one end side and the semicircular projections 31 on two sides, as indicated by reference symbols X in FIG. 6B. Therefore, the elastic press pieces 23A and 23B and the clamp plate 22 clamp the chassis 2 in the direction of thickness with the abutting forces generated between the clamp plate 22 and chassis 2, and accordingly the wire saddle 1 is fixed to the chassis 2. Regarding the horizontal direction, the elastic piece 25 abuts against the edge on one end side of the fitting hole 3 to generate a rightward elastic force (in FIG. 6B) in the clamp plate 22. Simultaneously, the locking pawl 241 engages with the edge on the opposite side of the fitting hole 3 to lock the rightward movement in FIG. 6B of the clamp plate 22. Consequently, the elastic piece 25 and locking pawl 241 restrict the leftward and rightward movements in FIG. 6B of the wire saddle 1, so that the above-described clamped state of the clamp plate 22 is held. Therefore, the wire saddle 1 is fixed as it is fitted in the fitting hole 3, as shown in FIG. 7, and is prevented from coming off from the chassis 2.

Figure 8:
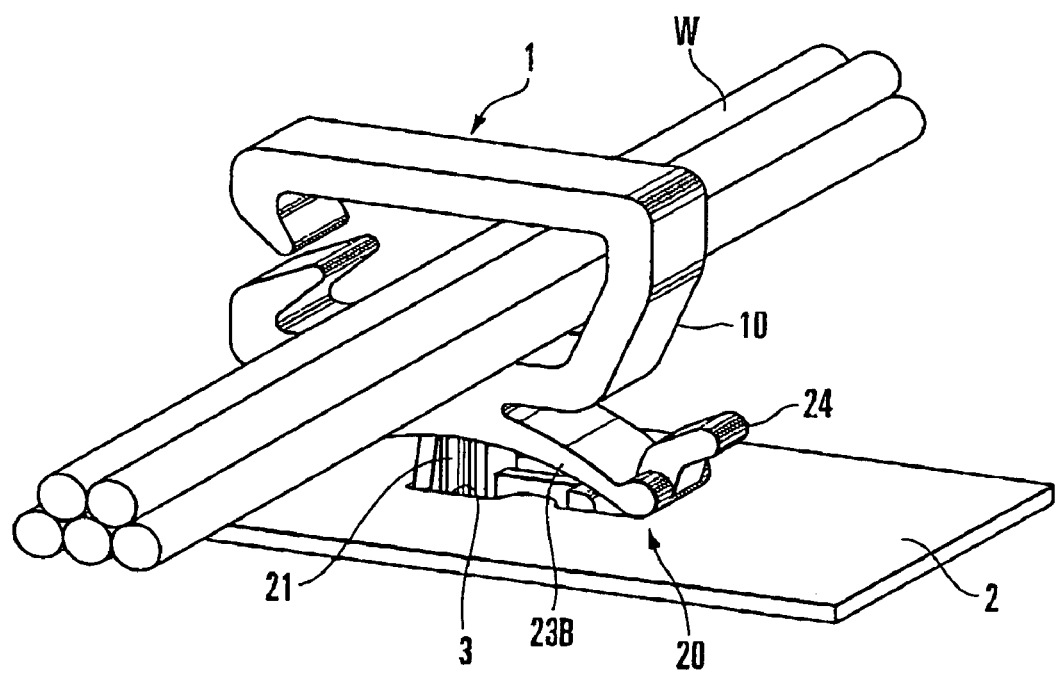
FIG. 8 is a perspective view showing a state wherein wires are held with the wire saddle.

In this state, as shown in FIG. 8, wires W are inserted in the U-shaped portion 11 of the holding portion 10 of the wire saddle 1 fixed to the chassis 2, and coming off of the wires W is prevented by the coming-off preventive pieces 12. Thus, the wires W can be held to extend along the upper surface of the chassis 2.

Figure 9A:
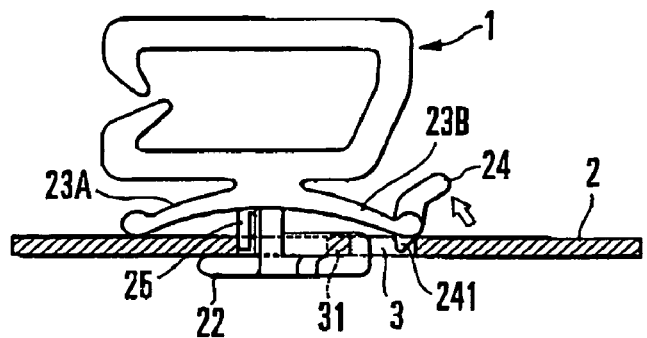
FIGS. 9A to 9D are front views showing the steps of removing the wire saddle from the chassis.
Figure 9B:
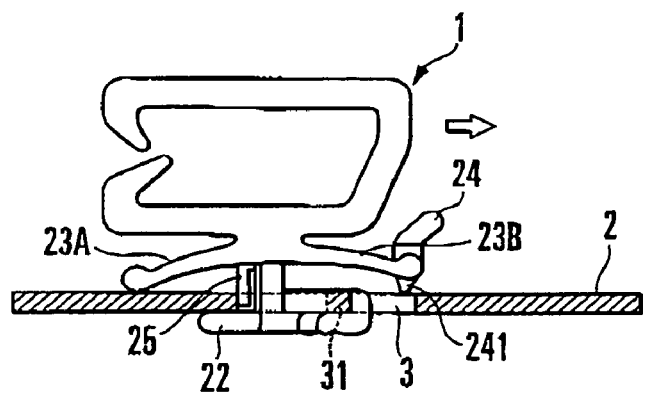
Figure 9C:
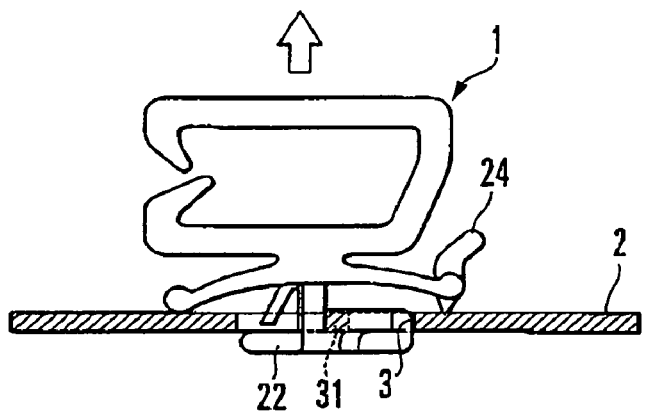
Figure 9D:
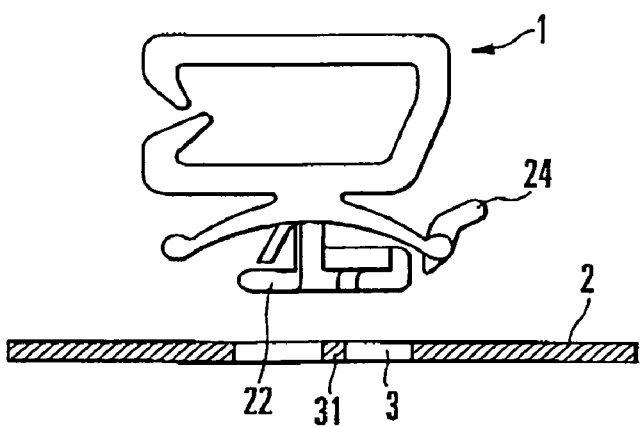

When the wire saddle 1 mounted on the chassis 2 is to be removed from the chassis 2, the unlocking knob 242 of the locking/unlocking piece 24 is pushed up with fingers, as shown in FIG. 9A. The elastic press piece 23B on the opposite side is elastically deformed upward, and the locking pawl 241 integral with the elastic press piece 23B is pulled out from the fitting hole 3 and is disengaged from the edge on the opposite side. As shown in FIG. 9B, the wire saddle 1 is slid rightward in the opposite direction to that in mounting, by utilizing the rightward elastic force in FIG. 9B of the elastic piece 25. Then, as shown in FIG. 9C, the wire saddle 1 is moved to a position where the post 21 abuts against the semicircular projections 31 of the fitting hole 3 and the locking wall 222 of the clamp plate 22 abuts against the edge on the opposite side of the fitting hole 3. At this movement position, as shown in FIG. 6A, the shapes of the clamp plate 22 and fitting hole 3 precisely coincide with each other. In this state, when the wire saddle 1 is pulled upward from the chassis 2, the clamp plate 22 disengages from the fitting hole 3, so that the wire saddle 1 can be removed from the chassis 2.

As described above, the wire saddle 1 of the first embodiment can be mounted on and removed from the chassis 2 easily from the upper surface side of the chassis 2. Thus, operation required when disassembling the wire saddle 1 from the chassis 2 as a measure to solve the environmental issues becomes easy. Meanwhile, when the wire saddle 1 is mounted on the chassis 2, the wire saddle 1 abuts against the clamp plate 22 on the lower surface of the chassis 2 at a total of three portions (portions X in FIG. 6B), i.e., the edge on one end side of the fitting hole 3 and the semicircular projections 31 on the two sides. Thus, the fitting state of the chassis 2 and clamp plate 22 becomes firm, and a stable fixed state is held. More specifically, the upper surface of the clamp plate 22 and the lower surface of the chassis 2 abut against each other at the three portions X that form a triangle when seen from the top. Even if an external force is applied to the wire saddle 1 from any direction, i.e., from the left or right, or from above or below, the posture and fixed state of the wire saddle 1 can be maintained stably. When the wire saddle 1 is in the fixed state, merely the clamp plate 22 projects to the lower surface side of the chassis 2. The clamp plate 22 is rarely deformed in the direction of thickness because of the locking wall 222 or reinforcing rib 223. Thus, the projecting length to the lower surface side of the chassis 2 is limited within the thickness of the clamp plate 22. As a result, even if the chassis is built in the device with a small space on the lower surface side, the wire saddle can be fixed to the chassis.

In the first embodiment, the shapes of the fitting hole 3 and clamp plate 22 in the planar direction are axi-symmetrical both in the vertical and horizontal directions. Even if the direction to mount the wire saddle is reversed, i.e., even if the right and left sides of FIGS. 5A to 5D and FIGS. 9A to 9D are reversed, the clamp plate 22 can be fixed to the chassis 2. Thus, the wire saddle 1 can be mounted and detached easily, and used more conveniently.

Figure 10A:
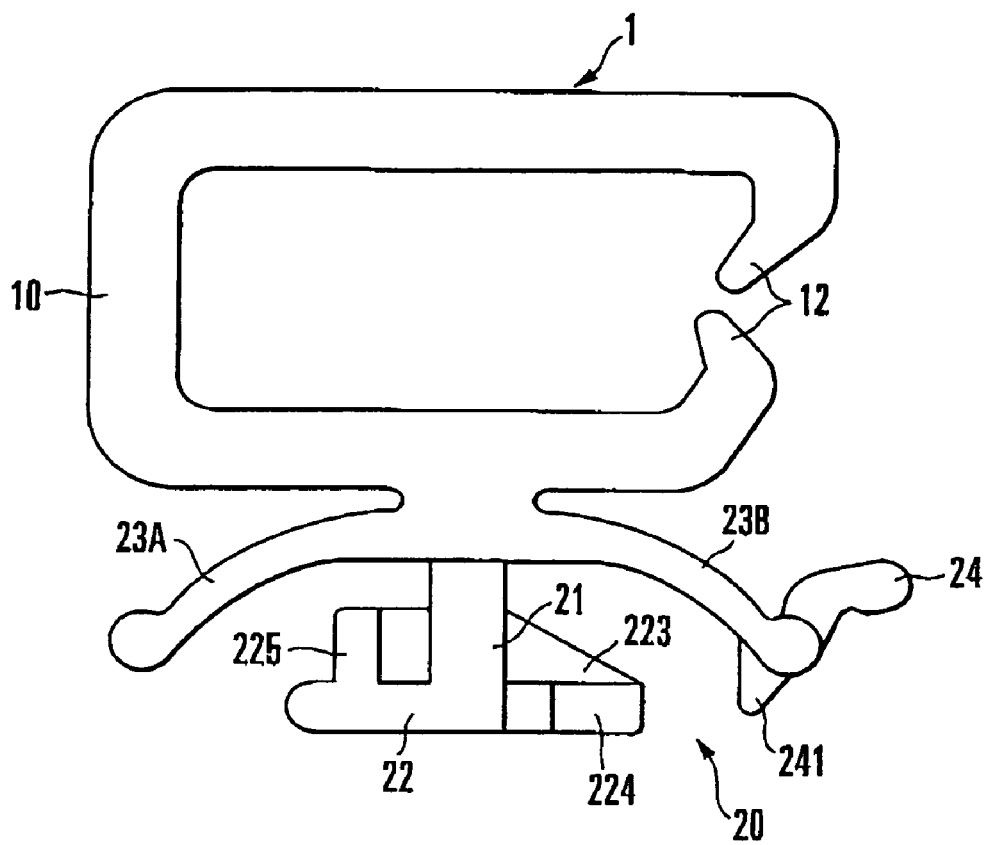
FIG. 10A is a plan view of the second embodiment.

Furthermore, as the locking pawl 241 of the locking/unlocking piece 24 engages with the edge of the same fitting hole 3 that the clamp plate 22 is to be fitted in, removal of the wire saddle 1 is prevented. Therefore, the chassis 2 need not have any other locking hole in addition to the fitting hole 3, so that the chassis 2 can be machined easily Second Embodiment FIG. 10A shows the second embodiment in which the present invention is applied to a wire saddle similar to that of the first embodiment. Portions that are equivalent to those of the first embodiment are denoted by the same reference numerals. In the second embodiment, the structure of a clamp plate 22 of a fitting portion 20 is different from that of the first embodiment. The clamp plate 22 has a rectangular shape, and two side portions 224 of its proximal end project in the widthwise direction to form a substantially T-shape. In the second embodiment, no elastic piece is provided. Instead, a locking wall 225 is formed to project upward from a position slightly retreated from the distal end of the clamp plate 22. A linear reinforcing rib 223 is integrally formed with the locking wall 225 to project to range from a post 21 to the proximal end.

Figure 10B:
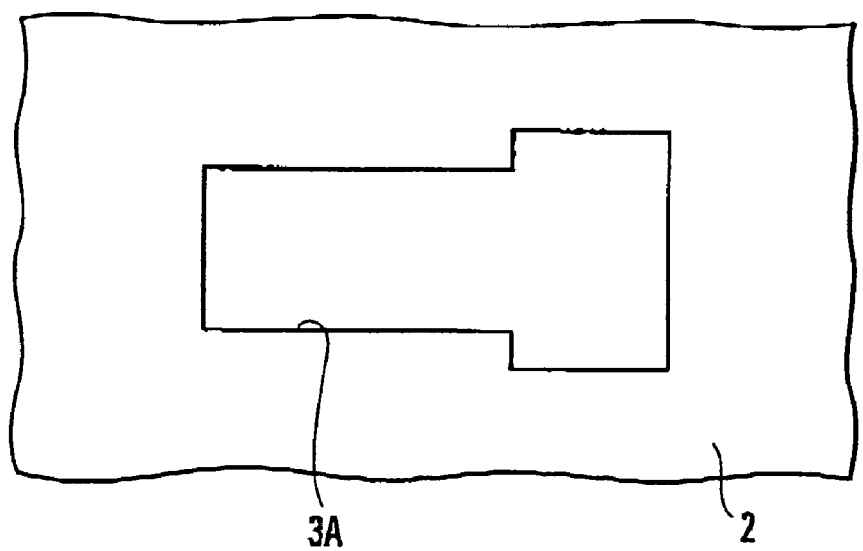
FIG. 10B is a plan view of the fitting hole of the second embodiment.
Figure 11A:
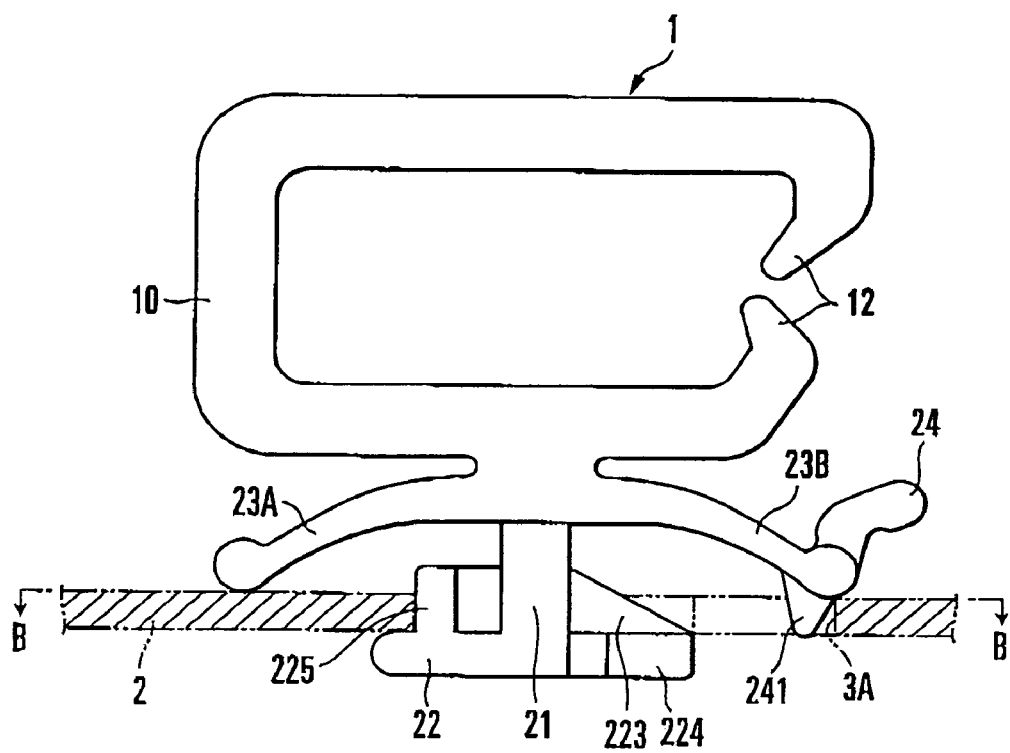
FIG. 11A is a front view showing the attached state of the second embodiment.
Figure 11B:
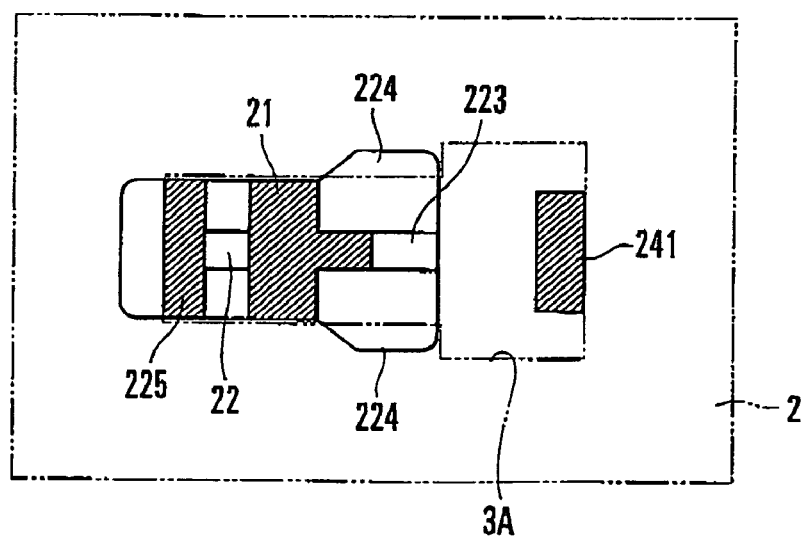
FIG. 11B is a sectional view taken along the line B—B of FIG. 11A.

In the second embodiment, as shown in FIG. 10B, a T-shaped fitting hole 3A having the same shape as that of the clamp plate 22 is formed in a chassis 2. FIG. 11A shows a state wherein the clamp plate 22 is mounted on the chassis 2, and FIG. 11B shows the section along the line B—B of FIG. 11A. As shown in FIGS. 11A and 11B, the clamp plate 22 is inserted through the chassis 2 from the upper surface side to the lower surface side, and a wire saddle 1 is moved toward the distal end of the clamp plate 22. Thus, a locking pawl 241 of a locking/unlocking piece 24 is locked by the other end of the fitting hole 3A, to prevent the clamp plate 22 from coming off from the fitting hole 3A. The clamp plate 22 and the lower surface of the chassis 2 abut against each other at three portions, i.e., the distal end of the fitting hole 3A and the two sides at the substantially middle position in the lengthwise direction of the fitting hole 3A, so that the chassis 2 is clamped between the clamp plate 22 and elastic press pieces 23A and 23B. Thus, the wire saddle 1 can be attached to the chassis 2.

In this manner, in the second embodiment as well, the clamp plate 22 abuts against the lower surface of the chassis 2 at the three portions of the edge of the fitting hole 3A. The fitting state of the chassis 2 and clamp plate 22 accordingly becomes firm, and a stable fixed state can be held. In the second embodiment, the locking/unlocking piece 24 is arranged on that opening side of a holding portion 10 where coming-off preventive pieces 12 are formed. Thus, the operation of mounting cables in the holding portion 10 and the operation of removing the wire saddle 1 from the chassis 2 can be performed from one direction, thus improving the operability.

Figure 12:
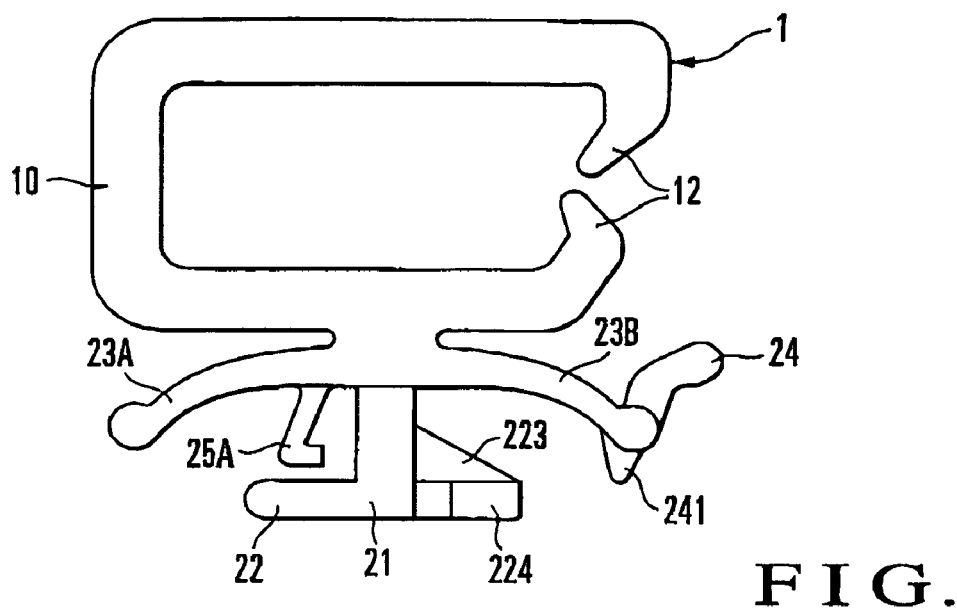
FIG. 12 is a front view of a modification to the second embodiment.

FIG. 12 shows a modification of the second embodiment. In FIG. 12, the locking wall (225) described above is not formed on the clamp plate 22, but the lower end of the elastic piece 25 of the first embodiment is bent to form an elastic piece 25A with an increased mechanical strength. The elastic piece 25A may function in substantially the same manner as the locking wall to perform positioning. Also, the locking pawl 241 of the locking/unlocking piece 24 may be prevented from disengaging from the fitting hole 3A.

Third Embodiment

Figure 13A:
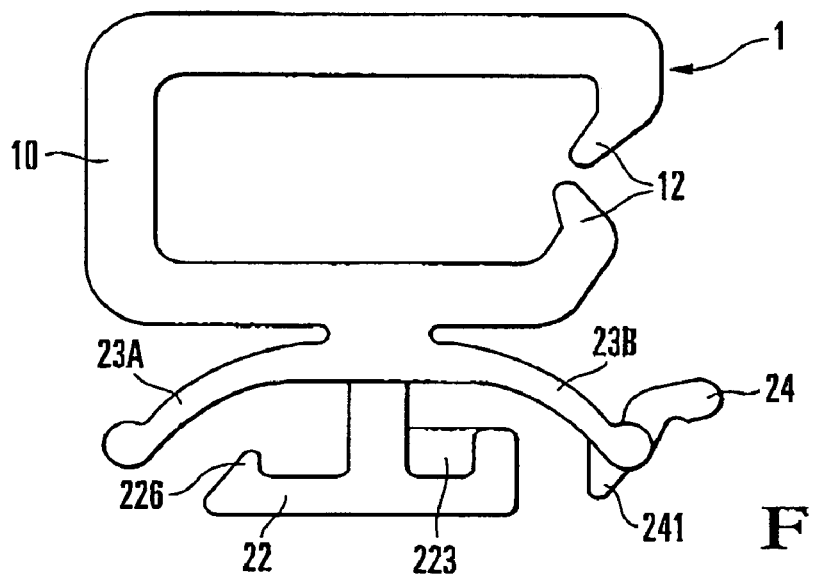
FIG. 13A is a front view of the third embodiment.
Figure 13B:
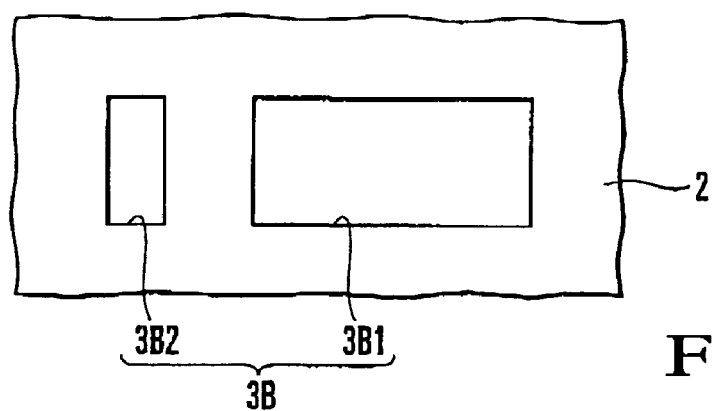
FIG. 13B is a plan view of the fitting hole of the third embodiment.

FIG. 13A shows the third embodiment. Portions that are equivalent to those of the first embodiment are denoted by the same reference numerals. In the third embodiment, a clamp plate 22 is formed to have a rectangular shape. The distal end side portion of the clamp plate 22 is made flat, and an upward hook 226 is formed at the distal end of the flat portion. FIG. 13B is a plan view of a fitting hole 3B formed in a chassis 2. The fitting hole 3B includes a main fitting hole 3B1 having the same rectangular shape as that of the clamp plate 22, and a small rectangular sub-fitting hole 3B2 which is formed next to the main fitting hole 3B1 to be separate from the main fitting hole 3B1 by such a distance that the sub-fitting hole 3B2 corresponds to the position of the hook 226.

Figure 14A:
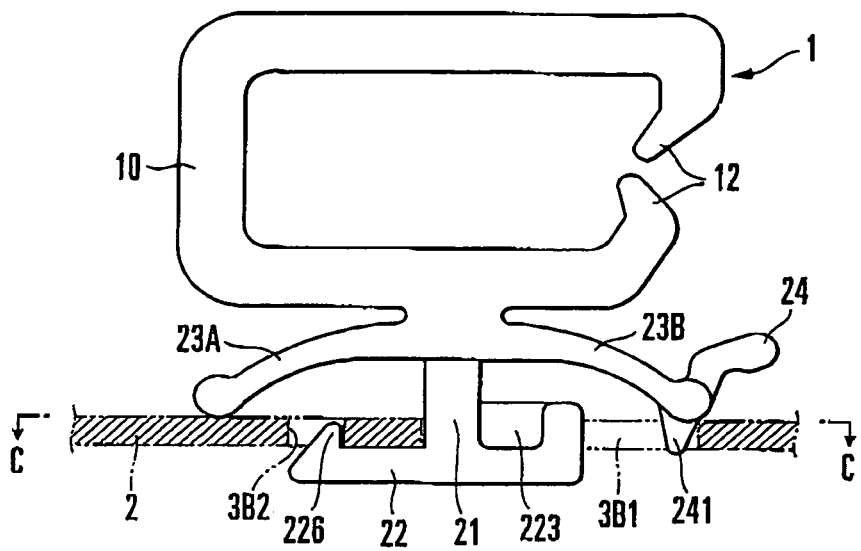
FIG. 14A is a front view showing the attached state of the second embodiment.
Figure 14B:
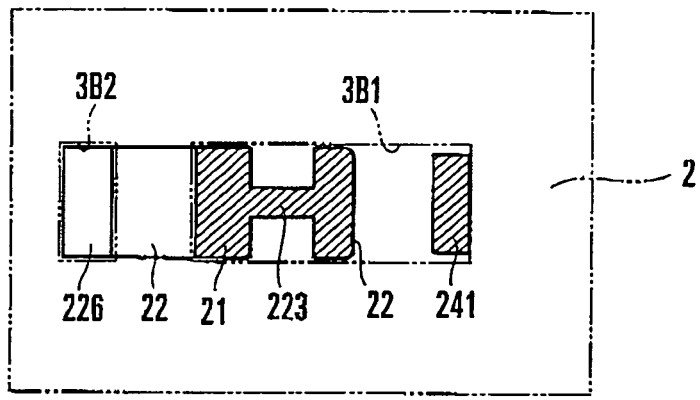
FIG. 14B is a sectional view taken along the line C—C of FIG. 14A.

FIG. 14A shows a state wherein a wire saddle 1 is mounted on the chassis 2, and FIG. 14B shows the section along the line C—C of FIG. 14A. As shown in FIGS. 14A and 14B, when mounting the wire saddle 1 on the chassis 2, the clamp plate 22 is inserted through the main fitting hole 3B1. When the wire saddle 1 is moved toward the distal end of the clamp plate 22, the hook 226 at the distal end of the clamp plate 22 engages with the sub-fitting hole 3B2, and simultaneously a locking pawl 241 of a locking/unlocking piece 24 engages with the edge on the proximal end side of the main fitting hole 3B1. In this manner, as the hook 226 and sub-fitting hole 3B2 engage with each other and simultaneously the locking/unlocking piece 24 is locked by the main fitting hole 3B1, a double locking structure is formed. The wire saddle 1 is reliably prevented from moving toward the proximal end side, and the clamp plate 22 is prevented from coming off from the main fitting hole 3B1. The upper surface of substantially half the region on the distal end side of the clamp plate 22 abuts against the lower surface of the chassis 2 at the edge between the main fitting hole 3B1 and sub-fitting hole 3B2. Thus, the wire saddle 1 can be attached to the chassis 2 stably.

Figure 15:
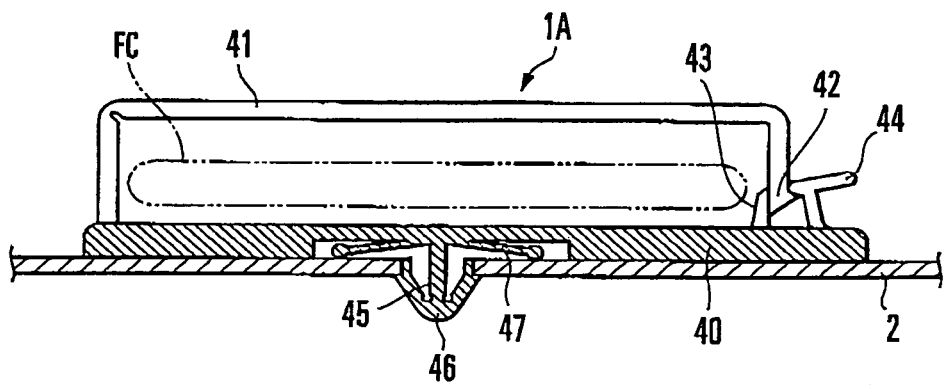
FIG. 15 is a front view of an example of a conventional fixing tool (FCC).

In the first embodiment, the fixing tool of the present invention is applied to a wire saddle. Apparently, the present invention can similarly be applied to a fixing tool to package an FCC as shown in FIG. 15 and other electronic components on a chassis. In the second and third embodiments, the shape of the fitting hole is asymmetric. This is effective when the direction to attach the wire saddle is to be specified.

According to the present invention, the clamp plate is inserted through the fitting hole of the chassis, and the fixing tool is slid in one direction. The clamp piece and elastic press piece clamp the edge of the fitting hole at a plurality of portions. Simultaneously, movement of the fixing tool in the opposite direction is locked by the locking/unlocking piece, so that the fixing tool is fixed by the clamp plate. When the locking/unlocking piece is released from engagement with the fitting hole and the fixing tool is slid in the opposite direction, clamp of the fixing tool by the clamp plate is released, and the fixing tool can be removed from the chassis. The operation of mounting and removing the fixing tool on and from the chassis can be performed easily. Thus, operation required when disassembling the printed board and wiring lines of an electronic product from the chassis or panel as a measure to solve the environmental issues becomes easy. In particular, the clamp plate clamps the chassis together with the elastic press piece at one portion of the fitting hole. Even when an external force is applied to the fixing tool, the fixing tool can be fixed stably. The locking/unlocking piece engages with the edge of the fitting hole that the clamp plate is to be fitted in. Thus, no independent hole for locking and unlocking need be formed in the chassis, and the chassis can be machined easily.

What is claimed is:

1. A fixing tool for holding a component on a chassis, the chassis having an upper surface, a lower surface, a thickness, and first and second edges at least partially defining a fitting hole, the fixing tool comprising:
   a holding portion; and
   a fitting portion formed integrally with said holding portion, the fitting portion receivable by the fitting hole to fix said holding portion to the chassis, said fitting portion including
   a post projecting for a length equal to not less than the chassis thickness,
   a clamp plate formed at a distal end of said post and insertable through the fitting hole,
   an elastic press piece elastically engageable with the upper surface of the chassis when the clamp plate is inserted through the fitting hole, and
   a locking/unlocking piece formed at a portion of said elastic press piece;
   wherein when said clamp plate is inserted through the fitting hole the clamp plate is moveable in a first direction to engage the lower surface along the first edge, thereby engaging said elastic press piece and the upper surface, and engaging said locking/unlocking piece with at least a portion of the second edge, and
   wherein moving said locking/unlocking piece in a direction away from the upper surface disengages said locking/unlocking piece from the second edge and removes the locking/unlocking piece from the fitting hole.

2. A fixing tool for holding a component on a chassis, the chassis having an upper surface, a lower surface, a thickness, and first and second edges at least partially defining a fitting hole, the fixing tool comprising:

a holding portion; and a fitting portion formed integrally with said holding portion, the fitting portion receivable by the fitting hole to fix said holding portion to the chassis, said fitting portion including:

a post projecting for a length equal to not less than the chassis thickness, a clamp plate formed at a distal end of said post and insertable through the fitting hole, an elastic press piece elastically engagable with the upper surface of the chassis when the clamp plate is inserted through the fitting hole, a locking/unlocking piece formed at a portion of said elastic press piece, and an elastic piece engagable with the first edge of the fitting hole, and wherein when said clamp plate is inserted through the fitting hole the clamp plate is moveable in a first direction to engage the lower surface along the first edge, thereby engaging said elastic press piece and the upper surface, and engaging said locking/unlocking piece with at least a portion of the second edge, and wherein the elastic piece biases said clamp plate in a second direction opposite the first direction.

3. The fixing tool according to claim 1, further comprising an elastic piece engagable with the first edge when said clamp plate is received by the fitting hole, and biasing said clamp plate in a second direction opposite the first direction.

* * * * *